US 6,857,016 B1

United States Patent
Motoyama et al.

(10) Patent No.: US 6,857,016 B1
(45) Date of Patent: Feb. 15, 2005

(54) METHOD AND SYSTEM OF DATA COLLECTION AND MAPPING FROM A REMOTE POSITION REPORTING DEVICE

(75) Inventors: Tetsuro Motoyama, Cupertino, CA (US); Avery Fong, Castro Valley, CA (US)

(73) Assignee: Ricoh Company Limited, Tokyo (JP)

( * ) Notice: Subject to any disclaimer, the term of this patent is extended or adjusted under 35 U.S.C. 154(b) by 758 days.

(21) Appl. No.: 09/668,162

(22) Filed: Sep. 25, 2000

(51) Int. Cl.[7] .................. G06F 15/173; G06F 15/16
(52) U.S. Cl. ........................... 709/224; 709/206
(58) Field of Search ............................. 709/203, 206, 709/219, 224–225

(56) References Cited

U.S. PATENT DOCUMENTS 6,327,533 B1 * 12/2001 Chou .......................... 701/207
6,618,004 B2 * 9/2003 Fenton et al. ........... 342/357.03
6,687,504 B1 * 2/2004 Raith ....................... 455/456.1

* cited by examiner

*Primary Examiner*—Ario Etienne
*Assistant Examiner*—Hussein Chanti
(74) *Attorney, Agent, or Firm*—Oblon, Spivak, McClelland, Maier & Neustadt, P.C.

(57) ABSTRACT

A computer-implemented system, method, and computer-program product for tracking and mapping a position of mobile object. A global position satellite receiver and information from at least two global position satellites is used to determine a position of a mobile object with the global position satellite receiver. The position of the mobile object is reported via the Internet to a recipient in search of the mobile object. A remote position reporting device of the monitoring system can be part of or attached to any mobile object such as a child, a skier, a car, and expensive items. The remote position reporting device includes a global positioning system (GPS) receiver, monitoring software and an Internet access module. The monitoring software (e.g., a dynamic link library) supports multiple data formats and multiple protocols to communicate the position information. The GPS receiver provides the monitoring software with position information at prescribed times, and the monitoring software records the position information. The monitoring software communicates the position information at prescribed times to a desired party through the Internet access module. The recipient of the position information can provide the information to a mapping software application that identifies the remote position reporting device and the current location of the device on a map. The mapping software can place all the previous position information from the remote position reporting device on the map to show the path of the device. The mapping software can use the services of a POP3 server or an FTP server to obtain position information at any time to map the current location and the past location of the remote position reporting device.

18 Claims, 17 Drawing Sheets

| Return Value | Function Name | Description |
|---|---|---|
| bool | getNextSession | Returns false when there is no more session; true otherwise |
| string | getFileName | Returns file name for the EventData |
| map<string, string> | getSessionInformation | Returns the map. Keys are UserID, ApplicationID, CumulativeSessionNumber, StartTime, and Duration. |
| map<string, vector<string>> | getSessionEventData | Returns the map. Keys are EventName and EventTiming. The values of EventTiming vector are in the unit of 10th of a second converted from unsigned integer to string. |

Figure 6B

| Return Value | Function Name | Description |
|---|---|---|
| bool | getNextLine | Returns one line of string data as an out parameter string. The function returns true if there is a line; false if no more line exists with empty string. |
| string | getFileNameWithSuffix | Returns file name for the data with suffix if applicable |

Figure 6C

METHOD AND SYSTEM OF DATA COLLECTION AND MAPPING FROM A REMOTE POSITION REPORTING DEVICE

REFERENCE TO RELATED APPLICATIONS

Continuity Statement: The present application is related to the following U.S. applications and patents: Ser. No. 09/575,710 filed Jul. 25, 2000; Ser. No. 09/575,702 filed Jul. 12, 2000; Ser. No. 09/453,934 filed May 17, 2000; Ser. No. 09/453,935 filed May 17, 2000; Ser. No. 09/453,936 filed May 17, 2000; Ser. No. 09/453,937 filed May 17, 2000; Ser. No. 09/542,284 filed Apr. 4, 2000; Ser. No. 09/520,368 filed Mar. 7, 2000; Ser. No. 09/440,692 filed Nov. 16, 1999; Ser. No. 09/440,647 filed Nov. 16, 1999; Ser. No. 09/440,646 filed Nov. 16, 1999; Ser. No. 09/440,693 filed Nov. 16, 1999; Ser. No. 09/440,645 filed Nov. 16, 1999; Ser. No. 09/408,443 filed Sep. 29, 1999; Ser. No. 09/407,769 filed Sep. 29, 1999; Ser. No. 09/393,677 filed Sep. 10, 1999; Ser. No. 09/311,148 filed May 13, 1999; Ser. No. 09/192,583 filed Nov. 17, 1998; Ser. No. 09/190,460 filed Nov. 13, 1998; Ser. No. 08/883,492 filed Jun. 26, 1997; Ser. No. 09/108,705 filed Jul. 1, 1998; Ser. No. 09/107,989 filed Jul. 1, 1998; Ser. No. 08/997,482 filed Dec. 23, 1997; Ser. No. 08/997,705 filed Dec. 23, 1997; Ser. No. 08/738,659 filed Oct. 30, 1996; Ser. No. 08/738,461 filed Oct. 30, 1996; Ser. No. 09/457,669 filed Dec. 9, 1999; Ser. No. 08/916,009 filed Aug. 21, 1997; Ser. No. 07/902,462 filed Jun. 19, 1992; Ser. No. 07/549,278 filed Jul. 6, 1990; U.S. Pat. Nos. 5,908,493; 5,887,216; 5,818,603; 5,819,110; 5,774,678; 5,649,120; 5,568,618; 5,544,289; 5537,554; and 5,412,779. The contents of each of those applications and patents is incorporated herein by reference.

BACKGROUND OF THE INVENTION

1. Field of the Invention

This invention generally relates to a method and system that can monitor and communicate positions of a mobile object by using a monitoring system that utilizes a software library to support multiple data formats and multiple protocols when communicating position information. More particularly, this invention relates to a method and system that collects and maps the position information received by the recipient of the position information.

2. Discussion of the Background

With the rise of chip technology, many devices (e.g., laptops) are getting smaller with higher capabilities. The mainframe computer of 30 years ago has less capability than current laptop computers. In addition, the advance of battery technology allows increased portability of various devices. The functions of the cellular phone also have been increasing, with some services now supporting Internet access through the cellular phone.

Technology continues to address many of today's problems. One current problem is finding a missing item (e.g., a stolen car) or a missing or distressed person. Tracking of vehicles such as automobiles and trucks is known. For example, Trimble Navigation Limited produces an array of products, including a global positioning system (GPS) by which data from mobile vehicles is sent via a wireless network at regular intervals to a centrally located base station to track the vehicles.

Tremendous effort (money and manpower) also can be expended when searching for a missing person without ever finding that person. "Personal Locator Services Emerge" by Hiroaki Koshima & Joseph Hoshen (IEEE Spectrum, February 2000, vol. 37, no. 2, pp. 41–48) (hereinafter "Koshima"), describes many implementations of a personal locator device, including those that use global positioning system (GPS), to locate the position of an individual with the device. The location of the individual with the personal locator device is obtained when a subscriber requests the individual's location through a location service provider or when the panic button on the device is pressed. The personal locator device communicates its location to the location service provider, and the information about the location of the individual is communicated to the subscriber. The system in Koshima utilizes a service center that has to be contacted by a requester to locate a missing subscriber (e.g., a patient suffering from dementia). Further, Layson, Jr. (U.S. Pat. No. 6,014,080) describes how global positioning system (GPS) data from a body-worn active and passive tracking device is sent via a wireless network to a centrally located base station.

SUMMARY OF THE INVENTION

There is a need for a remote position reporting device which sends properly formatted GPS data from mobile objects via a wireless network to any specified party using appropriate data formats and communication protocols such that the recipient (i.e., the person(s) in search of the mobile object) can read the location of the mobile object without having to depend on a base station or a location service provider to give the position of the mobile object. There is also a need for a mapping software that uses the formatted GPS data received from the remote position reporting device to display the device's position on a map so that the recipient can locate the mobile object.

Accordingly, one object of the present invention is to provide methods to improve the chances of finding a mobile object by periodically transmitting, from a position reporting device, GPS location data to a recipient in search of the mobile object. By communicating information about the mobile object's position(s) directly to the recipient in search of the mobile object, there is a greater chance that the mobile object will be found.

Another object of the present invention is to provide a system for monitoring the position of a mobile object with a global positioning system (GPS) receiver, a monitoring system, and an Internet access module communicating the position directly to the recipient in search of the mobile object.

A further object of the present invention is to provide a system for communicating data obtained by monitoring the position of a GPS receiver to a remote recipient by transmitting data in formats that ease the analysis of received data at the remote recipient.

A further object of the present invention is to provide a system for mapping the data obtained from the remote position reporting device onto a map so that the recipient of the data can easily identify the location of the mobile object and the path taken by the mobile object.

The present invention achieves these and other objects by monitoring the positions of a remote position reporting device (e.g., a device including a GPS receiver) that can be part of, or attached to, any mobile object including, but not limited to, a child, a skier, a car or expensive items. In one embodiment, the obtained positions are collected, logged and communicated to a desired location by at least one of (1) a store-and-forward protocol (e.g., Internet e-mail) and (2) a direct-connection protocol (erg., file transfer protocol (FTP)). The use of e-mail communication reduces the costs associated with communicating such data. The data can be communicated to the desired location at specified intervals. If necessary, direct connections between a monitored application and a monitoring system can be established in addition to, or instead of, the e-mail communication.

One advantage of the present invention is that the positioning information can be directed to the desired destination rather than to a central location. The present invention allows the location information of the subscriber to be directed to a home computer that may have mapping capability, showing the requester (1) where the subscriber is, (2) how quickly the subscriber is moving, and (3) in which direction the subscriber is moving. The system can likewise be used to track children coming home from school. Any abrupt departures from the path home could indicate that a monitored child is in trouble. With the present invention, there is no need to periodically contact a service center to determine the children's location, unless it is so desired.

Another advantage of the present invention is that the positioning information can be in any data format that can be read by various software that can display the positioning information on a map. Various software have different capabilities so that the subscribers can obtain the software according to their needs. This allows the subscribers to easily share location information (e.g., with a search and rescue team).

Another application of the device of the present invention is to utilize the device on persons entering dangerous situations (e.g., adventurous skiers who are likely to go to dangerous spots). The locations of the skiers can be reported directly to a rescue team. Should an avalanche occur, the rescue team would know whether or not the skiers escaped the path of the avalanche and, of those who did not escape, how many are to be rescued.

It is another object of the present invention to mount a remote position reporting device on or within a vehicle (e.g., a bus, boat, train, or taxi) such that the reporting device sends the position of the vehicle to a monitoring device without user intervention. The position information can be used to periodically update an estimated time of arrival.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6B is an exemplary EventData class interface for use in the architecture of FIG. 6A;

FIG. 6C is an exemplary FormattedEventData class interface for use in the architecture of FIG. 6A;

DETAILED DESCRIPTION

Figure 1:
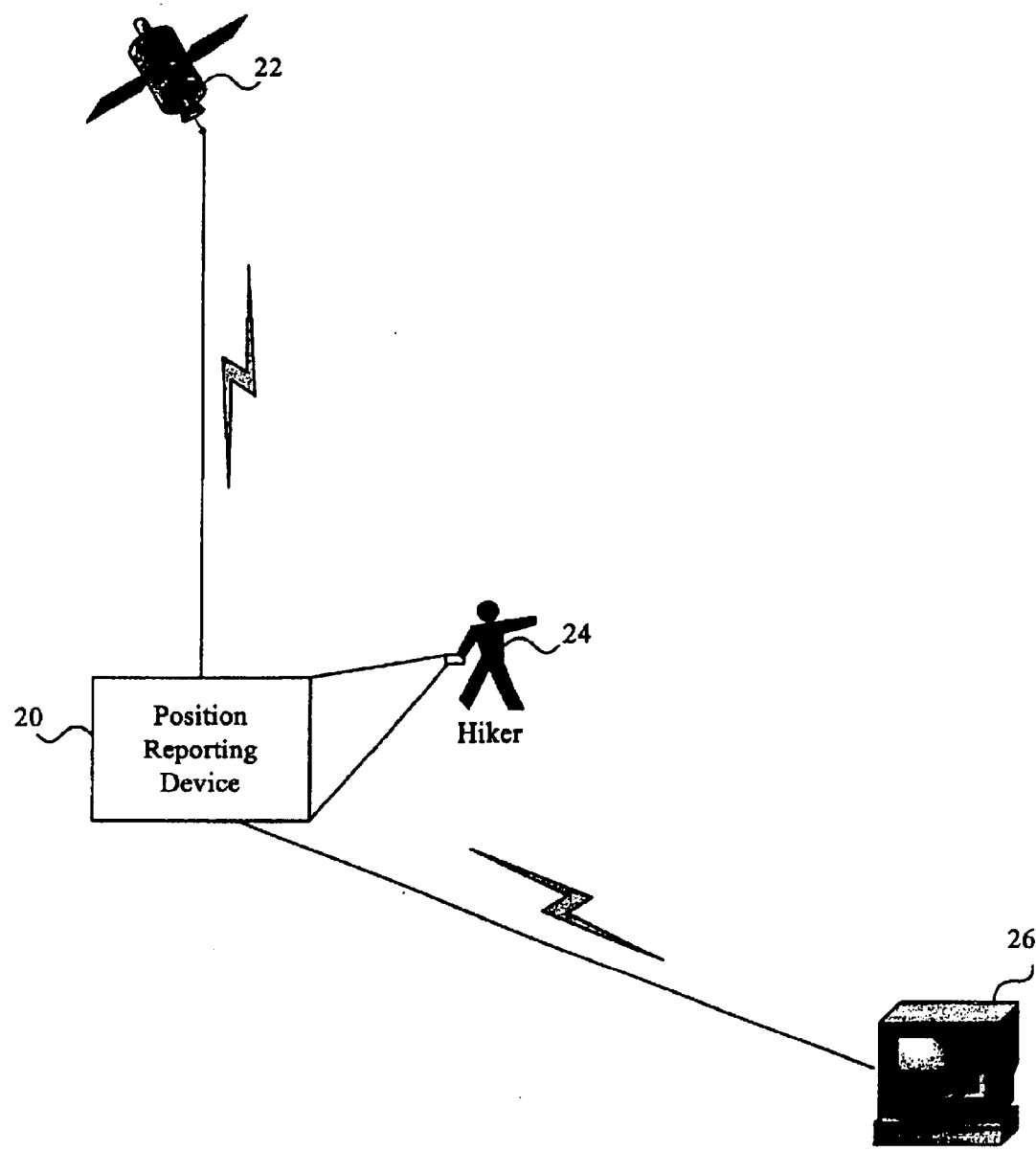
FIG. 1 illustrates the use of the position reporting device to send position information to a desired party.

Referring now to the drawings, FIG. 1 illustrates a position reporting device 20 whose position is being monitored. As shown in FIG. 1, according to one embodiment, a GPS satellite 22 of a larger GPS constellation transmits information to the position reporting device 20. The information is used by the position reporting device 20 to determine its own position. The position reporting device 20 can determine its own position using techniques such as those taught by Matsumoto (U.S. Pat. No. 5,210,540), Hwang (U.S. Pat. No. 5,021,792) (both incorporated herein by reference), or other techniques known in the GPS field that calculate positions from signals received from plural known locations (e.g., plural GPS satellites, plural ground stations, or a combination thereof). The position reporting device 20 may obtain the information continuously or periodically. The position reporting device 20 can be used to obtain the position of any mobile object (e.g., a hiker 24 (see FIG. 1), a child, a bike, a car, a pair of skis, a snowboard, a boat, or a hang glider). As would be appreciated, the position reporting device 20 may be affixed to (either permanently or temporarily) or placed inside any of the mobile objects, as necessary. The position information is (1) collected in the position reporting device 20 and (2) communicated to a desired party (e.g., using a store-and-forward or direct communication protocol) using wireless communication. In FIG. 1, the position information is communicated to a computer workstation 26. The user of the workstation 26 is provided information on the location of a mobile object (e.g., the hiker 24). If the object is missing, the user of the computer workstation 26 can use the position information communicated to it to provide information to a search team to quickly find the object.

Figure 2:
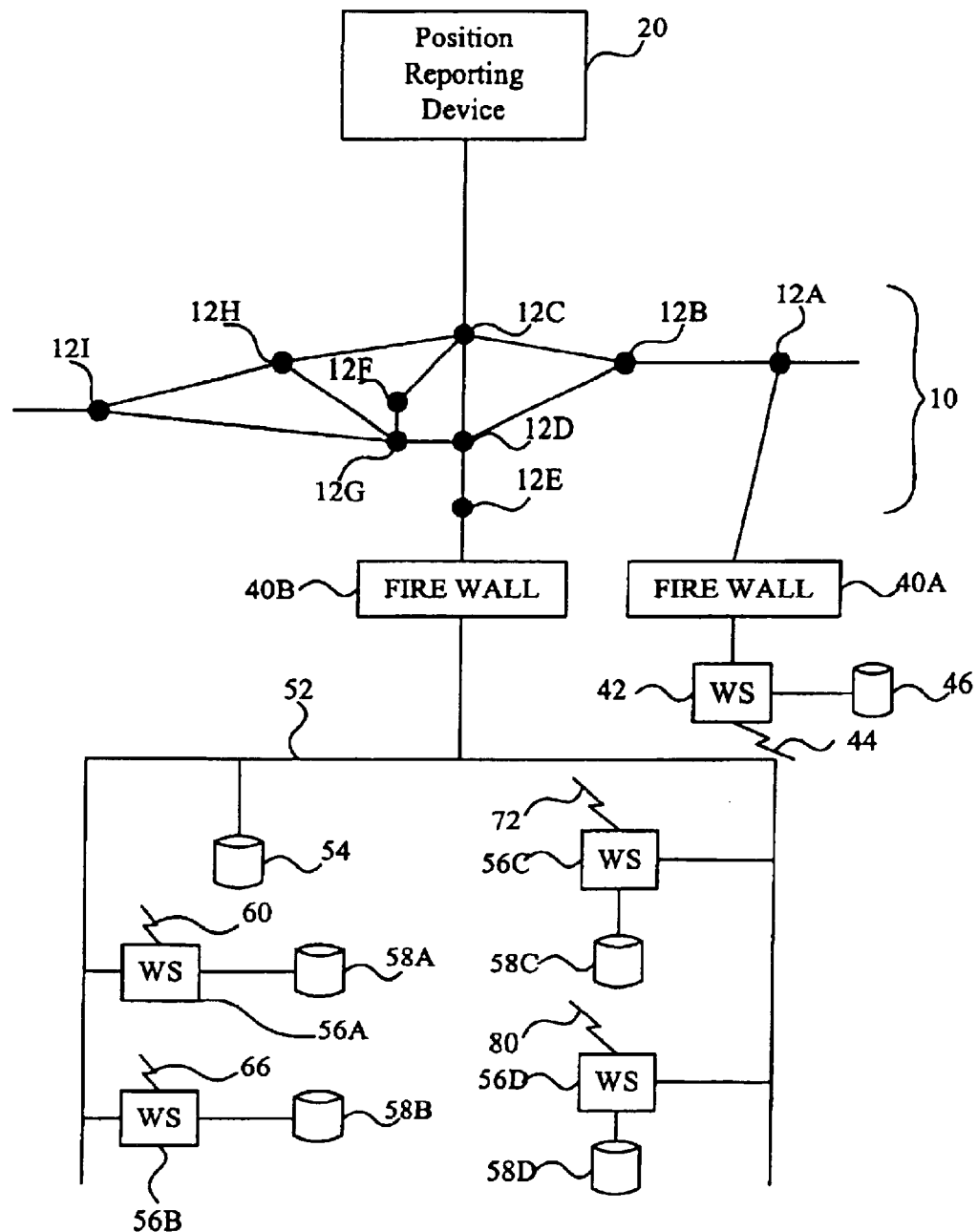
FIG. 2 illustrates a position reporting device connected to a network of computers and databases through a Wide Area Network (e.g., the Internet)

FIG. 2 illustrates a position reporting device 20 connected to a Wide Area Network (WAN) 10 via a wireless connection (e.g., using a radio frequency (RF) or infra-red (IR) transmitter or transceiver). The position reporting device 20 obtains signals from the GPS satellites and determines its own position. The position reporting device 20 collects position information and then communicates this information to a recipient. Wireless transceivers are commercially available from Ricochet Wireless, Sprint PCS Wireless, and RCN's Blackberry Wireless Email.

In FIG. 2, a wide area network (e.g., the Internet or its successor) is generally designated by 10. The WAN 10 can be a private WAN or a public WAN. The WAN 10 includes a plurality of interconnected computers and routers designated by 12A–12I. The manner of communicating over a WAN is known through RFC documents available from the Internet Engineering Task Force (IETF) at www.ietf.org/rfc.html. Transmission Control Protocol/Internet Protocol (TCP/IP) related communication is described in several references, including (1) TCP/IP Illustrated, Vol. 1, The Protocols, by Stevens, from Addison-Wesley Publishing Company, 1994, ISBN: 0201633469, (2) Internetworking with TCP/IP by Corner and Stevens, 4th edition, Vol. 1 (Apr. 15, 2000), Prentice Hall; ISBN: 0130183806, (3) Internetworking with TCP/IP, Vol. II, ANSI C Version: Design, Implementation, and Internals, by Corner and Stevens, $3^{rd}$ edition (Jun. 10, 1998), Prentice Hall; ISBN: 0139738436, and (4) Internetworking with TCP/IP, Vol. III, Client-Server Programming and Applications-Windows Sockets Version, by Corner and Stevens, $1^{st}$ edition (Apr. 28, 1997) Prentice Hall; ISBN: 0138487146. The contents of all four books are incorporated herein by reference in their entirety.

In FIG. 2, a firewall 40B is connected between the WAN 10 and a network 52. Also, a firewall 40A is connected between the WAN 10 and a workstation 42. The firewall 40B is a device that allows only authorized computers on one side of the firewall to access a network or other computers on the other side of the firewall. Firewalls such as firewall 40A and 40B are known and commercially available devices and/or software and, for example, include SunScreen from Sun Microsystems Inc.

The network 52 is a conventional network and includes a plurality of workstations 56A–56D. In addition to the workstations connected via the network 52, there is a workstation 42 that is not directly connected to the network 52. Information in a database stored in a disk 46 may be shared using proper encryption and protocols over the WAN 10 to the workstations connected directly to the network 52. Also, the workstation 42 includes a direct connection to a telephone line and/or Integrated Services Digital Network (ISDN) and/or cable and/or wireless network 44, and the database in disk 46 may be accessed through the telephone line, ISDN, cable or wirelessly. The cable used by this invention may be implemented using a cable which typically is used to carry television programming, a cable which provides for high speed communication of digital data typically used with computers or the like, or any other desired type of cable. The workstations 42 and 56A–56D that are connected to the WAN provide a secure connection to the position reporting device 20. This allows the position reporting device 20 to properly communicate its position information to any of the workstations 42 and 56A–56D. Devices 58A–58D are data storage devices. A feature of the present invention is the use of a "store-and-forward" mode of communication (e.g., Internet e-mail) or transmission between the position reporting device 20 and a workstation for monitoring the position information. The "store-and-forward" process alleviates the need for the position reporting device 20 having to wait until a direct connection is established with the recipient. Because of network delays, the communication could take a substantial amount of time during which the application would be unresponsive. Such unresponsiveness can be unacceptable to the recipient, if for example, one is tracking the motion of the position reporting device 20. By using e-mail as the store-and-forward process, retransmission attempts after failures occur automatically for a fixed period of time. Alternatively, the message that is transmitted may be implemented using a mode of communication that makes direct, end-to-end connections.

Figure 3:
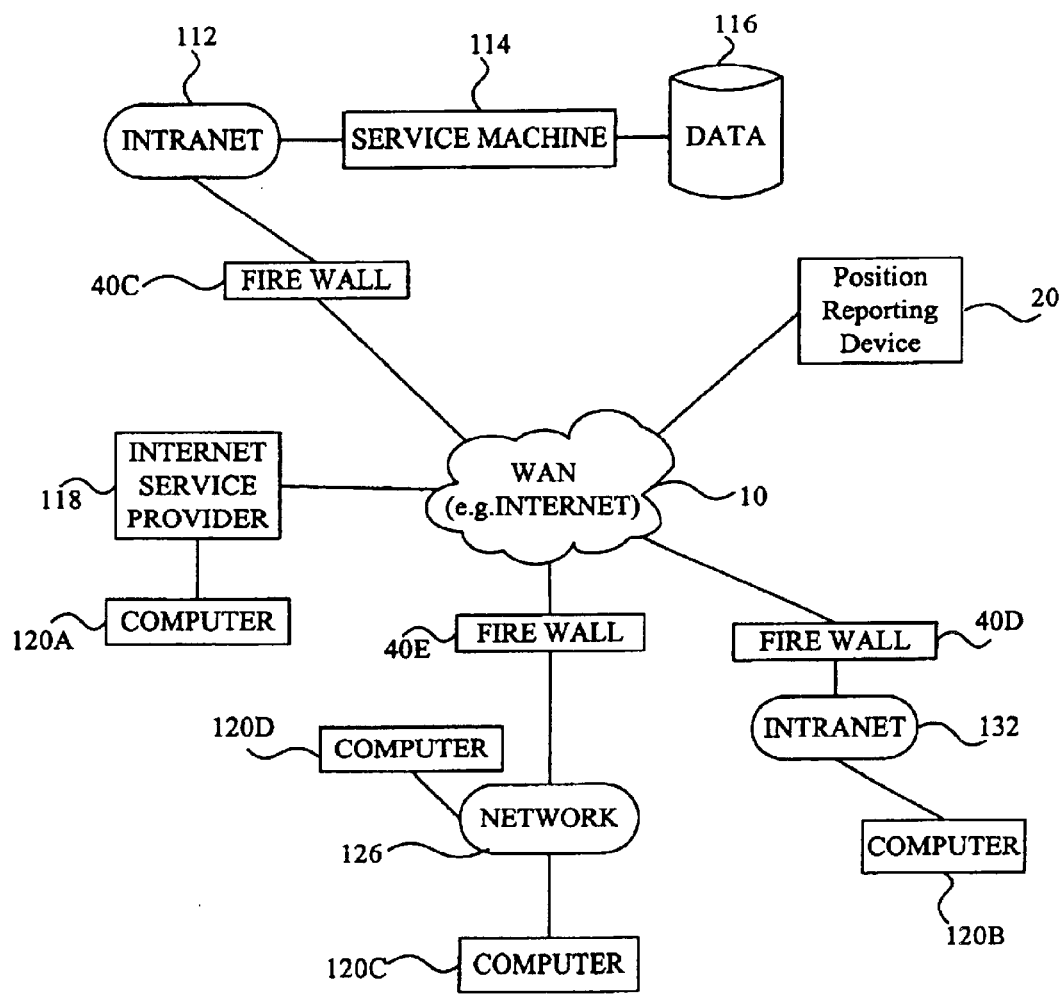
FIG. 3 illustrates an alternative system configuration in which a position reporting device is connected to various networks through a Wide Area Network (e.g., the Internet)

FIG. 3 illustrates an alternative system diagram of the present invention in which different devices and subsystems are connected to the WAN 10. However, there is no requirement to have each of these devices or subsystems as part of the invention. Each component or subsystem illustrated in FIG. 3 is individually a part of the invention. Further, the elements illustrated in FIG. 2 may be connected to the WAN 10 that is illustrated in FIG. 3. In FIG. 3, there is a position reporting device 20 that is connected to the WAN 10 via a wireless connection. Further in FIG. 3, there is illustrated a firewall 40C connected to an Intranet 112. The service machine 114 connected to the Intranet 112 includes therein or has connected thereto data 116 which may be stored in a database format. The data 116 may include a history of the position information of the position reporting device 20 that is being monitored. The service machine 114 may be implemented as any type of device and is preferably implemented using a computerized device such as a general-purpose computer.

An alternate type of sub-system includes the use of an Internet Service Provider (ISP) 118 that may be any type of ISP, including known commercial companies such as for example America Online, Mindspring, and Niftyserve. In this sub-system, a computer 120A is connected to the ISP 118 through a modem (e.g., an analog telephone line modem, a cable modem, an ISDN-based modem, an Asymmetric Digital Subscriber Line (ADSL)-based modem, a frame relay adapter, a wireless (e.g., radio frequency) modem, an optical modem, or a device that uses infrared light waves). The computer 120A may receive position information communicated to it by the position reporting device 20.

Also illustrated in FIG. 3 is a firewall 40E connected to a network 126. The network 126 may be implemented as any type of computer network (e.g., an Ethernet or Token-Ring network). Networking software that may be used to control the network includes any desired networking software including software commercially available from Novell or Microsoft. The network 126 may be implemented as an Intranet, if desired. Computers 120D and 120C connected to the network 126 may receive position information from the position reporting device 20. The wireless communication described herein may be established using spread spectrum techniques including techniques which use a spreading code and frequency hopping techniques such as the frequency hopping technique disclosed in the Bluetooth Specification (available at the World Wide Web site www.bluetooth.com), which is incorporated herein by reference.

Another sub-system illustrated in FIG. 3 includes a firewall 40D, an Intranet 132, and a computer 120B. The computer 120B may receive position information from the position reporting device 20. While FIG. 3 illustrates a plurality of firewalls, the firewalls are preferable but optional equipment and therefore the invention may be operated without the use of firewalls, if desired.

Figure 4:
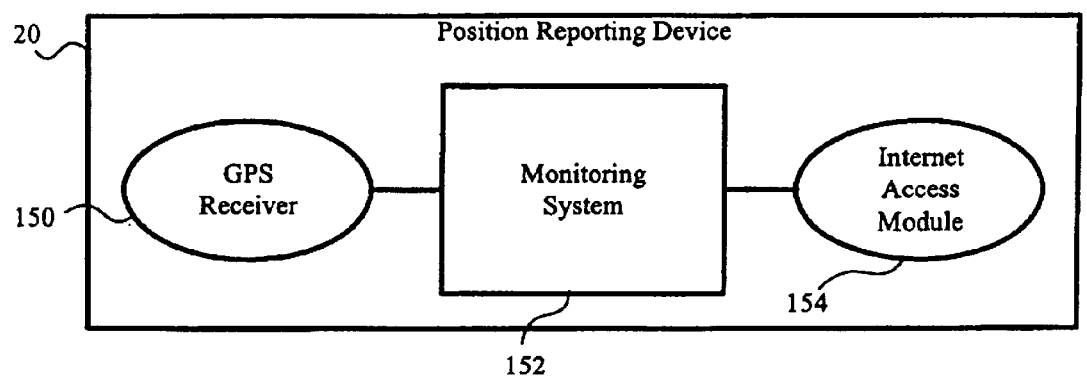
FIG. 4 illustrates components of the position reporting device according to one embodiment of the present invention.

FIG. 4 shows the components of the position reporting device 20. The position reporting device 20 contains a GPS receiver 150. The GPS receiver 150 obtains signals from GPS satellites or ground stations to determine its position. GPS receivers are available in the form of handheld GPS receivers, automotive GPS receivers, and fixed-mount GPS receivers. Commercially available handheld GPS receivers include the Magellan GPS Blazer 12, Trimble GeoExplorer 3, and Garmin GPS 12CX HandHeld GPS. Commercially available automotive GPS receivers include the Magellan 750 Nav—Neverlost, Philips Carin GPS Navigation System, and Garmin StreetPilot Portable GPS Mapping System.

Further in FIG. 4, the position reporting device 20 contains a monitoring system 152. The monitoring system 152 may be software (e.g., a dynamic link library (DLL)) that the GPS receiver 150 interfaces with to record the position information. The monitoring system 152 monitors and maintains the position information of position reporting device 20 and when triggered, the monitoring system 152 will communicate the position information to a desired party.

The position reporting device 20 also contains a communications access module (e.g., an Internet access module 154). The Internet access module 154 interfaces with the monitoring system 152 so that it may communicate the position information to a desired party. The Internet access module 154 provides wireless access to the Internet so that wireless communication can occur. As mentioned above, there are commercially available products that establish connections to the Internet using wireless communications (e.g., Ricochet Wireless, Sprint PCS Wireless, and RCN's Blackberry Wireless Email).

Figure 5:
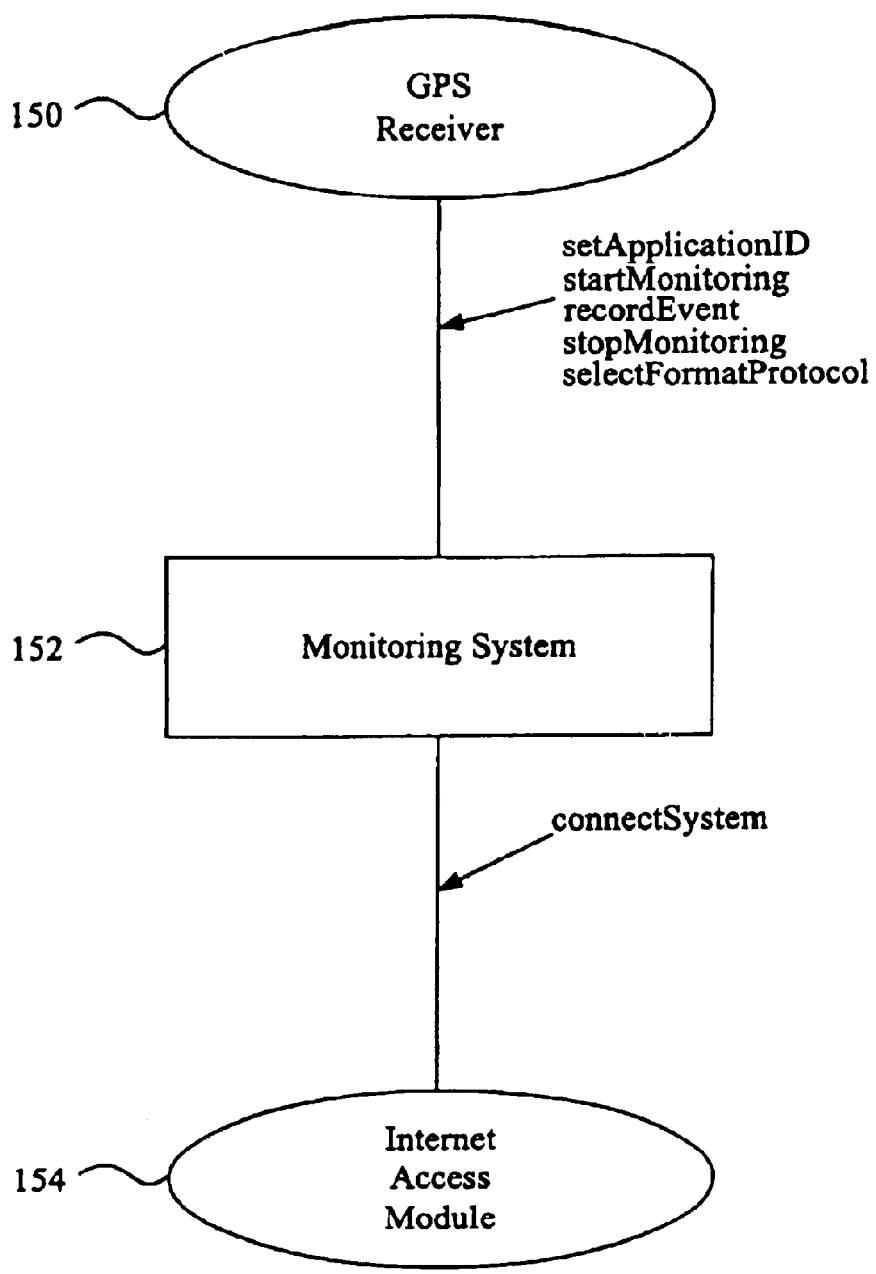
FIG. 5 shows the general architecture of the position reporting device according to one embodiment of the present invention.

FIG. 5 shows the general event management architecture of the position reporting device 20 that can be implemented as any one, or a combination of, a dynamic link library, a script, a JAVA, C++, or other object oriented language class, a library routine, etc. The remainder of this discussion describes the implementation in terms of a DLL. The GPS receiver 150 obtains information from the GPS satellites and determines its position. The position reporting device 20 may obtain its position information either periodically (e.g., every minute or every 5 minutes) or aperiodically (after five minutes, then after ten minutes, then after three minutes, etc.).

Further in FIG. 5, the monitoring system 152 is the monitoring software or monitoring DLL that the position reporting device 20 uses to record and maintain the position information it collects. In one embodiment, the monitoring system 152 provides five interface functions to the GPS receiver 150. SetApplicationID( ) allows the GPS receiver 150 to inform the monitoring system 152 about the identification of the position reporting device 20. StartMonitoring( ) allows the GPS receiver 150 to inform the monitoring system 152 that the monitoring system 152 should prepare to log information about its position. StartMonitoring( ) lets the monitoring system 152 initialize itself before recording position information. RecordEvent( ) allows the GPS receiver 150 to inform the monitoring system 152 that it should record the position information. The GPS receiver 150 will pass information to the monitoring system 152 about its position. The monitoring system 152 maintains information about the position reporting device position. The monitoring system 152 may either maintain information about its latest position or information about its position over a period of time. SelectFormatProtocol( ) allows the GPS receiver 150 to inform the monitoring system 152 which format and protocol to use to communicate the position information to a desired party. StopMonitoring( ) allows the GPS receiver 150 to inform the monitoring system 152 that it should stop recording position information. In addition to triggering the monitoring system 152 to communicate the position information periodically, the monitoring system 152 can be triggered to communicate the position information to a desired party when the GPS receiver 150 calls the interface function StopMonitoring( ).

FIG. 5 shows an Internet access module 154 that allows the monitoring system 152 to communicate the position information to the desired party. The Internet access module 154 provides the monitoring system 152 wireless access to the Internet so that it may use simple mail transfer protocol (SMTP) or file transfer protocol (FTP) to communicate the position information to the desired party such as the recipient in a direct search for the mobile object. In one embodiment, the Internet access module 154 provides the interface function ConnectSystem( ) to the monitoring system 152 to provide it access to the Internet.

The monitoring system 152 contains information about the desired party to which the position information is communicated. In one embodiment, this information is set up in the position reporting device 20 prior to attaching it to a mobile object. This setup allows the position reporting device 20 to communicate the position information to any desired party or recipient. Alternatively, the desired party can be identified after attaching the device 20 to the mobile object.

Figure 6A:
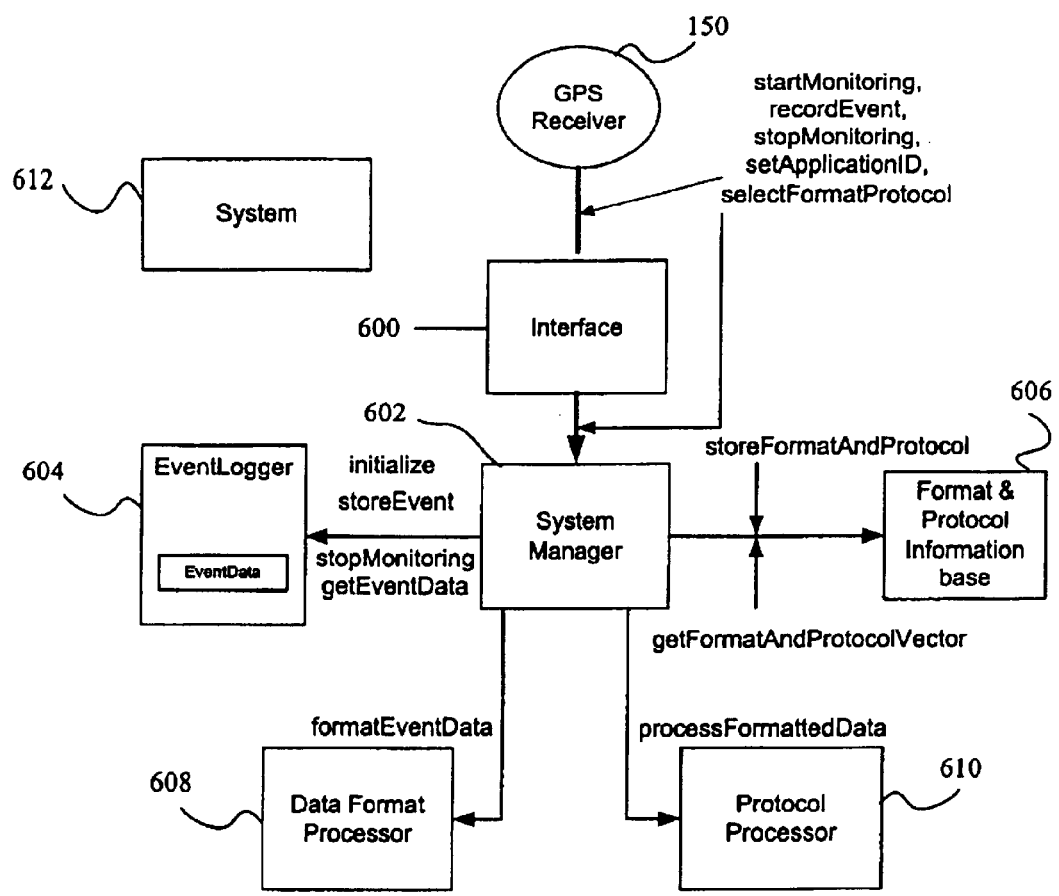
FIG. 6A shows the general architecture of the monitoring system according to one embodiment of the present invention.

FIG. 6A shows the general event management architecture of the system that can be implemented as any one, or a combination of, a dynamic link library (DLL), a static link library, a script, a Java, C++ or other object oriented language class, a C library or routine, etc. The remainder of this discussion describes the implementation in terms of a DLL. In general, a GPS receiver control application 150 communicates through an interface 600. The interface 600 specifies the application program interface (API) for the event management architecture (e.g., how position information is passed via a C or C++ function call to the object(s) in the system manager 602 with the same names). The system manager computer code device 602 manages the behavior of other computer code devices by using appropriate objects and their functions. Similarly, the event logger 604 records log information such as, for example, User ID, Application ID, Cumulative Session Number, Start Time, Duration and Sequence of Events with the elapsed times when requested through the system manager 602. The event logger 604 supports functions including: initialize( ), storeEvent( ), stopMonitoring( ), and getEventData( ).

In one embodiment, the initializes function receives a string parameter for the Application ID. The system manager 602 calls this function when startMonitoring( ) is called by the GPS receiver control application 150. The initializes function sets the Application ID, takes care of the cumulative number of usages, reads the clock to store the start time in order to compute the elapsed time and duration, and sets up the user information by examining the registry.

After initialization, the storeEvent( ) function can be called with a string parameter for the Event passed by recordEvent( ). The event logger 604 stores the event string and the elapsed time from the start time (recorded during the initializes function call).

After the application 150 has completed its usage monitoring, it calls the stopMonitoring( ) function so that the duration can be computed. If multiple sessions are stored, this function stops the recording of a corresponding session.

The event logger 604 also provides access to a getEventData( ) function. If the stopMonitoring( ) function was not previously called (i.e., the current session's duration field is undefined), the monitoring is stopped by calling the stopMonitoring( ) function. The stopMonitoring( ) function computes the duration of the current session. The getEventData( ) function returns an abstract class with the access functions shown in FIG. 6B. The abstract class facilitates extensions for multiple sessions.

The format and protocol information base system 606 (implemented as any one or a combination of package, DLL, static library, etc.) stores the format and protocol information and checks the combination of formats and protocols to determine the valid combinations. To facilitate the storage process, the storeFormatAndProtocol( ) function accepts two parameters (i.e., one for format and one for protocol). The function checks to ensure that the parameters are a valid combination.

The component 606 also includes a getFormatAndProtocolVector( ) function that returns a format and associated vector of protocols. In one embodiment, the function performs error checking. For example, if a protocol allows only one format to be sent, then the format should be the last format in the function call of selectFormatProtocol( ). The return value is a boolean value where true indicates that valid parameters were returned and false indicates that no more data is available. The return parameters are int and vector of int. The first int refers to the format while the vector of int refers to the vector of protocols for the format. When there is no selectFormatProtocol( ) function call, the getFormatAndProtocolVector( ) returns the default setting. As would also be evident, other collections (e.g., a list template) may be used in place of a vector.

The data format processor 608 is responsible for formatting event data into a specified format. One exemplary function is the formatEventData( ) function that receives a pointer to the abstract class EventData. The return value is a pointer to the abstract class FormattedEventData. Generally, the interface to the FormattedEventData abstract class is defined as in FIG. 6C.

The protocol processor 610 is responsible for communicating the formatted event data through the specified protocol. In one embodiment, the processor 610 also encrypts the data before it is sent. To output the data, the processFormattedData( ) function is called with an input pointer to the abstract class FormattedEventData. The function returns a boolean value where "true" represents no errors, and "false" represents the existence of an error while sending the formatted data.

The system 612 supplies important information and persistent information across the execution of the DLL. Some of the important information is timer information through the library call. The registry to keep the necessary information is another important component of the system 612. Many registry entries are set up at installation time. An exemplary structure for the registry is:

HKEY_LOCAL_MACHINE—SOFTWARE— RicohMonitor—XXX(ApplicationID)

Where XXX represents the Application ID, the following variables are placed in the registry under XXX tree: CumulativeUsage, UserID, SMTP Server, Recipients, From, FTP Server, FTP User, FTP Password, FTP Target Path etc. In one embodiment, CumulativeUsage is an integer, and the rest of the variables are strings.

Figure 7:
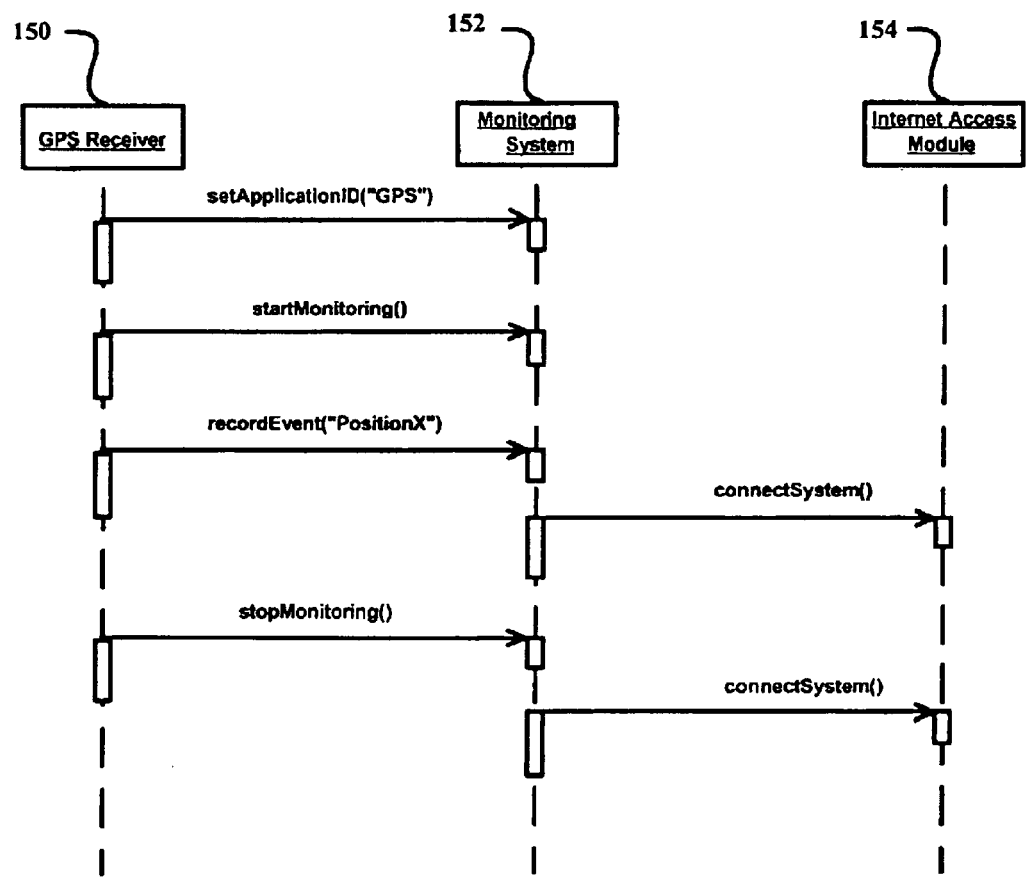
FIG. 7 shows the calling sequence of the interface functions within the position reporting device in one embodiment of the present invention.

FIG. 7 shows an exemplary calling sequence within the position reporting device 20. The GPS receiver 150 sets the application ID through the interface function SetApplicationID( ) of the monitoring system. The GPS receiver 150 starts the monitoring of the position information through the interface function StartMonitoring( ) of the monitoring system 152. The monitoring system 152 records and maintains start information. The GPS receiver 150 obtains position information periodically. For each occurrence, the GPS receiver 150 calls the interface function RecordEvent( ) of the monitoring system 152 passing the position information so that the monitoring system 152 will keep track of the position information. The monitoring system 152 will periodically communicate the position information by calling the interface function ConnectSystem( ) of the Internet access module 154 to obtain wireless access to the Internet. This will allow the monitoring system 152 to communicate the position information to a desired party. When the position reporting device 20 is turned off, the GPS receiver stops monitoring the position information by calling the interface function StopMonitoring( ) of the monitoring system 152. The monitoring system 152 will communicate the final position information by calling the interface function ConnectSystem( ) of the Internet access module 154 to obtain wireless access to the Internet and to communicate the position information to a desired party.

Figure 8:
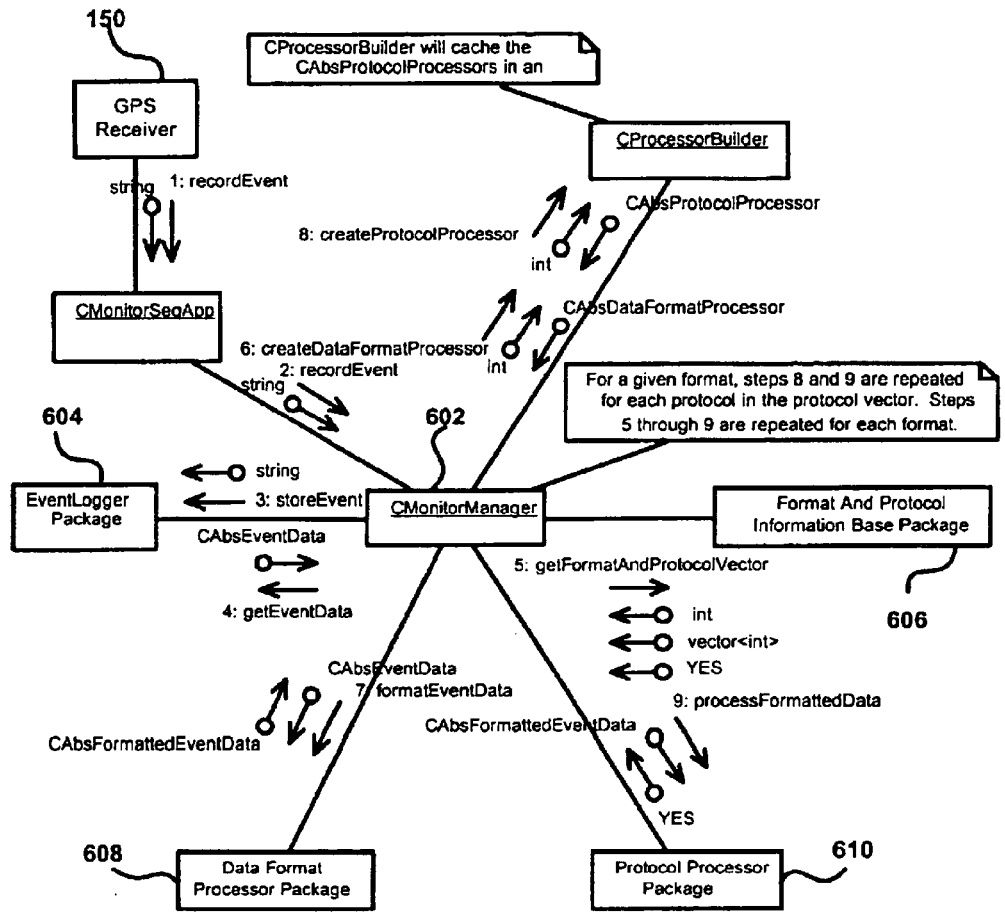
FIG. 8 shows the processing when the monitoring system sends the monitored position information with the specified formats using the specified protocols according to one embodiment of the present invention.

FIG. 8 describes the process of sending the monitored position information. The position information is sent periodically after the position information has been collected by the monitoring system 152. Steps 1 through 3 show the process of recording the latest position information after the GPS receiver 150 has obtained information about its location. Step 4, entitled "getEventData," shows the process of obtaining the position information in order to communicate it to the recipient or desired party. This position information may correspond to the latest position information or the position information over a period of time. The class CMonitorManager acts as the system manager 602 and contains trigger information about when to communicate the position information. Step 5, entitled "getFormatAndProtocolVector," shows the process of obtaining the data format and communication protocol in which the position information is communicated to the desired party. Later, step 6, entitled "CreateDataFormatProcessor," creates a data formatter for the selected formatting that is used to format the position information in step 7. Step 8 obtains the protocol processor that is used to communicate the position information in step 9. Together, steps 6 and 8 show that the formatters and protocol processors can be created dynamically (i.e., only when they are needed).

Figure 9:
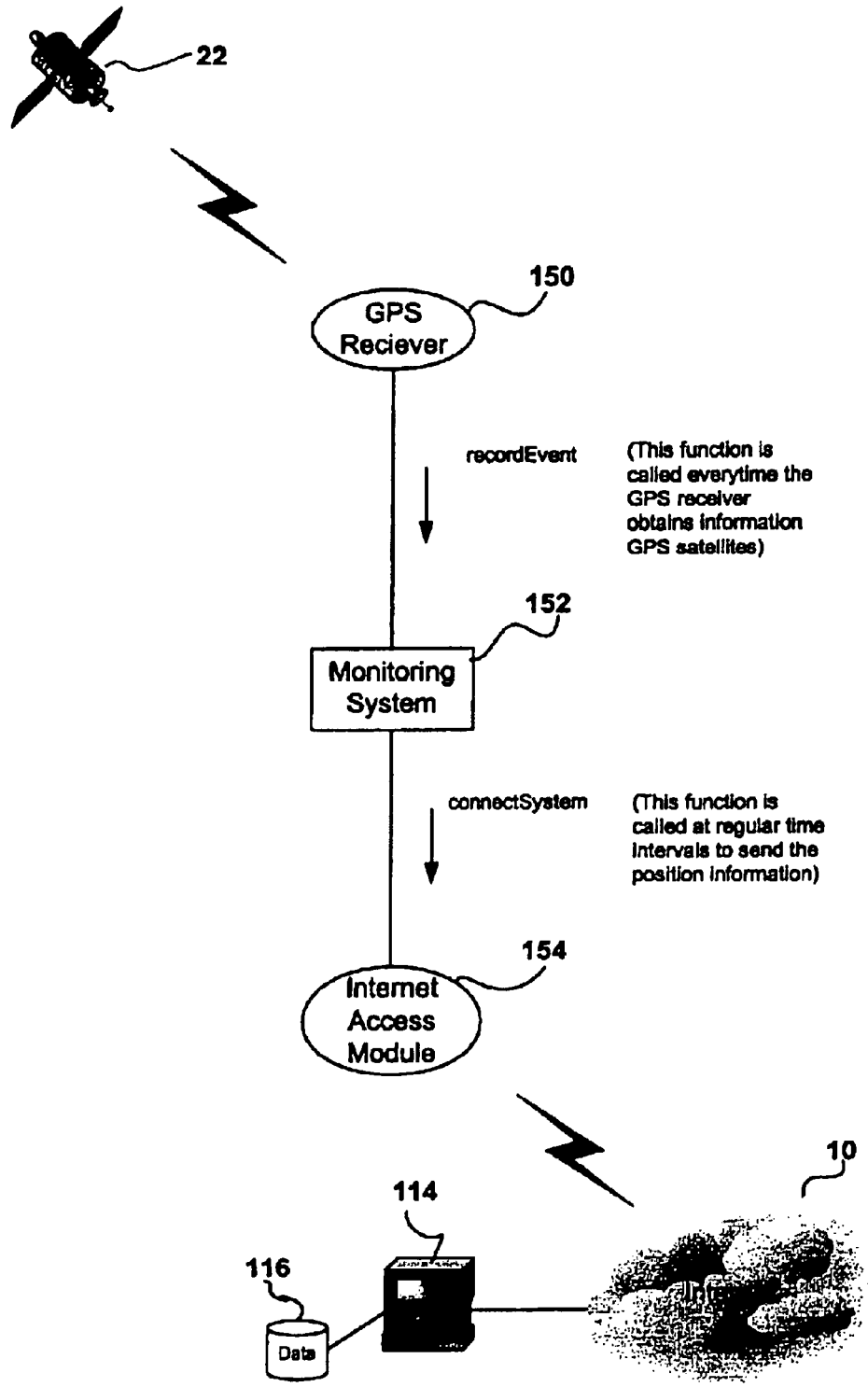
FIG. 9 shows an alternative calling sequence of the interface functions from the position reporting device.

FIG. 9 describes the use of the position reporting device 20. The GPS receiver 150 obtains signals from GPS satellites 22. The GPS receiver 150 determines the location of the position reporting device 20 and records the location in the monitoring system 152 through the interface function RecordEvent( ). The GPS receiver 150 obtains, determines, and records the position of the position reporting device 20 at specified times. The monitoring system 152 will record the position information and, after a time interval, will communicate the position information to a desired recipient. The monitoring system 152 will obtain wireless access to the WAN (e.g., the Internet) 10 to communicate the position information through the interface function ConnectSystem( ) of the Internet access module 154. The position reporting device 20 communicates with the Internet 10 via wireless communication. The position information will be delivered to the desired recipient through the Internet 10 via email or file transfer protocol. The position information is obtained by the computer workstation 114 and may be stored on a data storage device 116 in a database.

Figure 10:
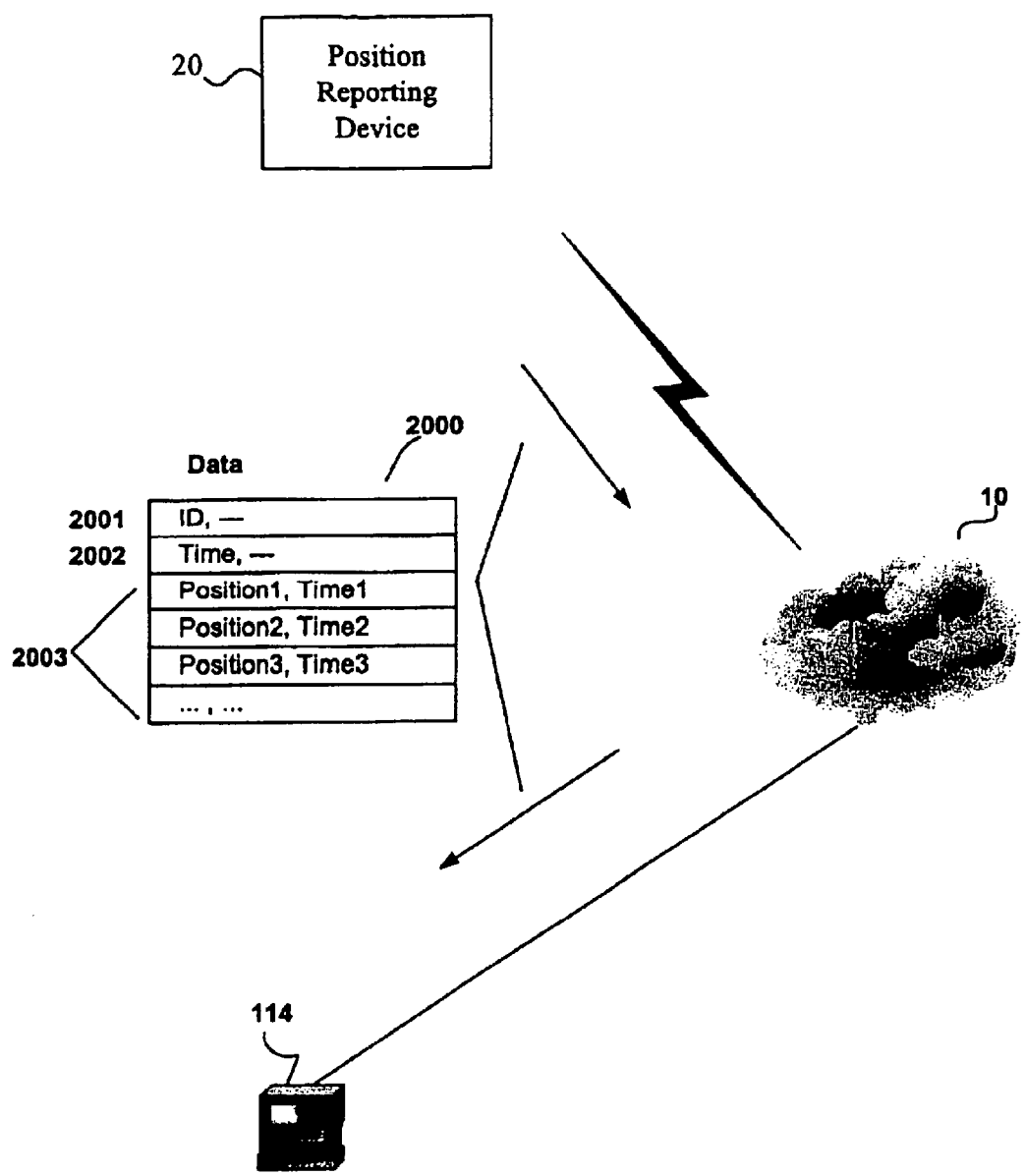
FIG. 10 illustrates an exemplary structure of data that is communicated from the remote position reporting device.

FIG. 10 shows an exemplary structure of data 2000 that is communicated from the remote position reporting device 20 to a computer workstation 114 through the WAN (e.g., the Internet) 10 via wireless access. In this example, the data 2000 contains a field identifying the remote position reporting device 20 (ID 2001), a field containing the current time (Time 2002), and a series of fields containing the position of the device at different times (Positionn, Timen 2003). As would be well understood by those of ordinary skill in the art, the data for the position of the device can be represented in any of the various coordinate systems such as, for example, the World Geodetic Datum and the North American Datum (NAD). Descriptions of several of these coordinate systems are provided at the World Wide Web site www.colorado.edu/geography/gcraft/notes/datum/datum_f.html, which is incorporated herein by reference.

Figure 11:
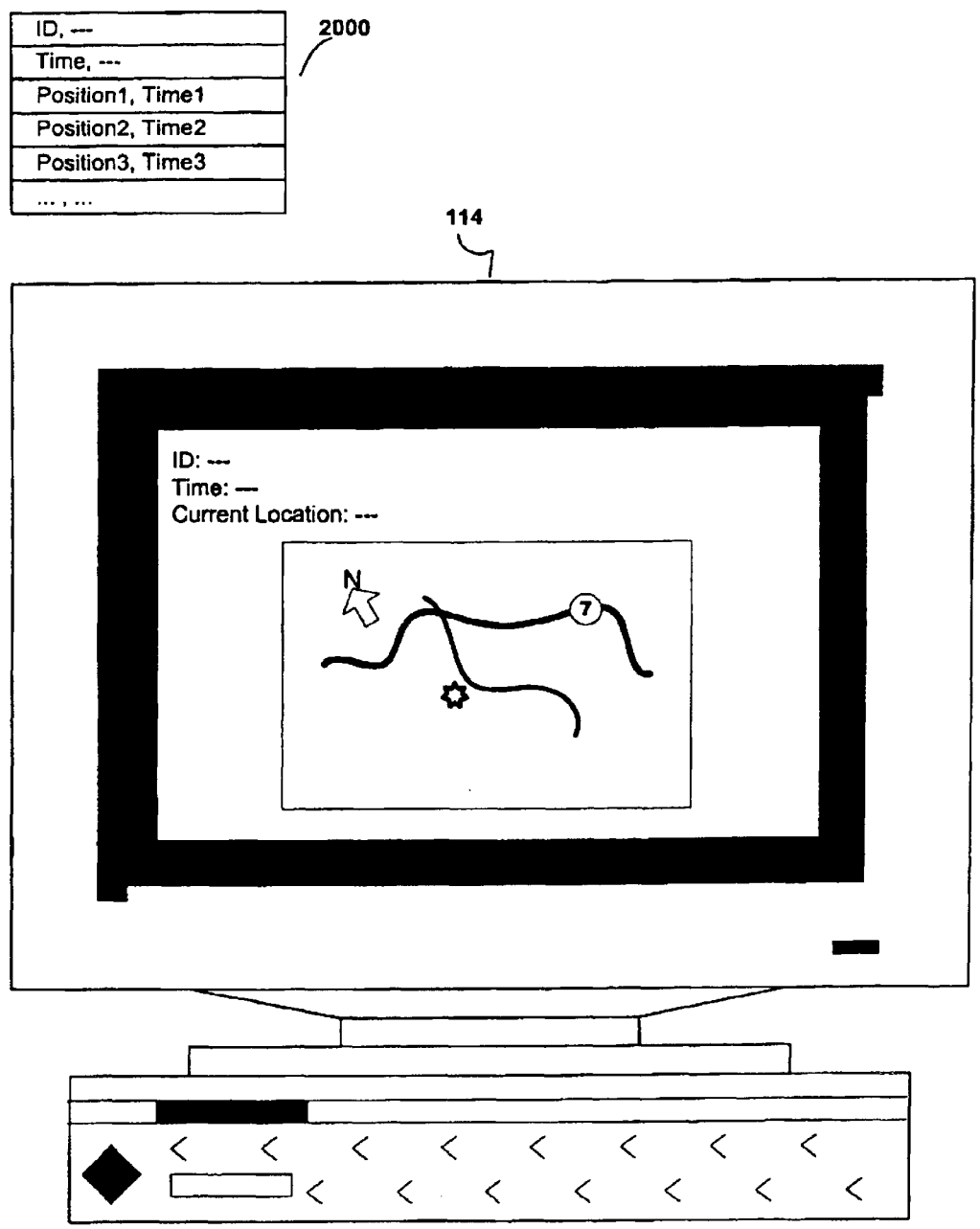
FIG. 11 shows the mapping of the data onto the computer workstation in one embodiment of the present invention.

FIG. 11 illustrates how the data 2000 that has been communicated by the position reporting device 20 may be mapped and graphically presented on the workstation 114. A software application such as a commercially available geographic information system (GIS) product or other mapping product is used to read the data 2000 and to present the data 2000 as graphical indicators placed on a map at the geographic location indicated by the data. A mapping projection such as the State Plane Coordinate System or the Cylindrical Projection may be used to more accurately plot the position represented in the data 2000 received by the position reporting device 20 onto a map. As is well understood by those of ordinary skill in the mapping art, mapping projections take into account the earth's curved surface, so as to enable the creation of an accurate flat representation of the earth's surface such as on a piece of paper or on a computer screen. Descriptions of the mapping projections mentioned above and others are available at the World Wide Web site www.colorado.edu/geography/gcraft/notes/mapproj/mapproj f.html, which is incorporated herein by reference. Mapping and GIS software is readily available that allows data 2000 received from the position reporting device 20 to be plotted onto a map, including, among those are Delorme's Street Atlas USA, Intergraph's VistaMap, and ESRI's MapObjects.

Figure 12:
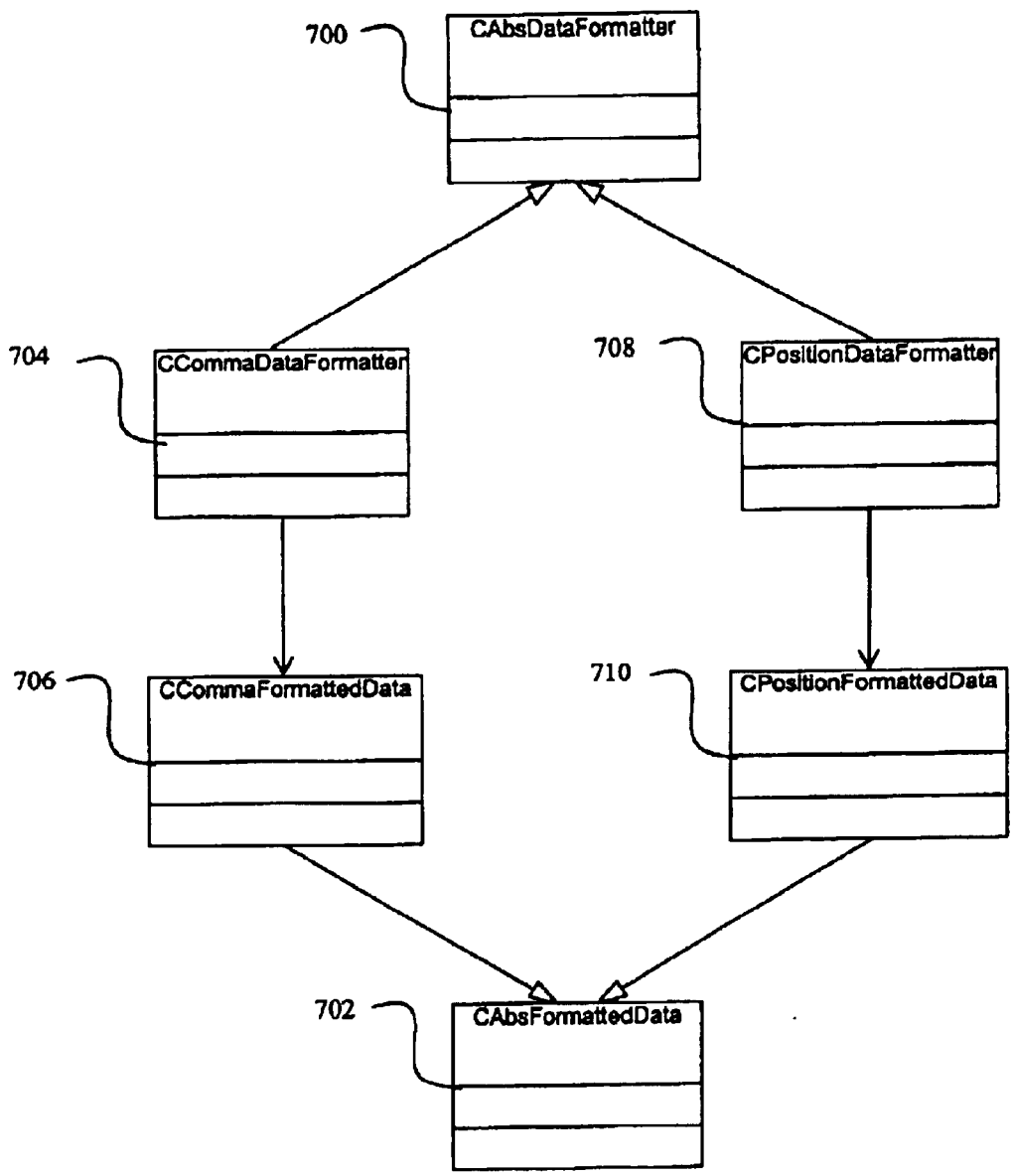
FIG. 12 shows a class diagram of the Data Format Processor package of FIG. 6a according to one embodiment of the present invention.

FIG. 12 shows a class diagram for one embodiment of the data format processor package of FIG. 6A. As shown in FIG. 12, the class structure provides the monitoring system 152 with flexibility to represent the position information in a variety of formats. Newly defined or newly desired formats for the representation of position information may be easily added to the monitoring system 152. The monitoring system 152 uses two abstract classes—CAbsDataFormatter 700 and CAbsFormattedData 702.

CAbsDataFormatter 700 provides the interface that allows the data obtained by the monitoring system 152 from the GPS receiver (e.g, the data 2000 shown in FIG. 10) to be formatted. The classes derived from CAbsDataFormatter 700 provide the method for formatting the data. Two derived classes of CAbsDataFormatter 700 are CCommaDataFormatter 704 and CPositionDataFormatter 708, each of which provides a method for formatting the data.

CAbsFormattedData 702 provides the interface for accessing the formatted data. The classes derived from CAbsFormattedData 702 provide the method for accessing the formatted data. Two derived classes of CAbsFormattedData 702 are CCommaFormattedData 706 and CPositionForimattedData 710, each of which provides a method for accessing the formatted data.

Additional classes derived from CAbsDataFormatter 700 and CAbsFormattedData 702 can be added as support for different representations of the position information are desired. Therefore, the format of the position data depends on the mapping or GIS software used to plot the data onto the map on the computer workstation 114. The design of the class structure of the monitoring system 152 of the present invention is flexible such that it can accommodate any format required by or supported by the software selected for plotting the position information.

A computer workstation 114 may not be continually running, and, accordingly, the software application may not be able to plot continuous position information on a map. For example, parents will monitor the position of their child when the child is walking home from school, but not during the time when their child is in school or at home. The remote position reporting device 20 will continually communicate the position information whether the computer workstation 114 is on or off.

Figure 13:
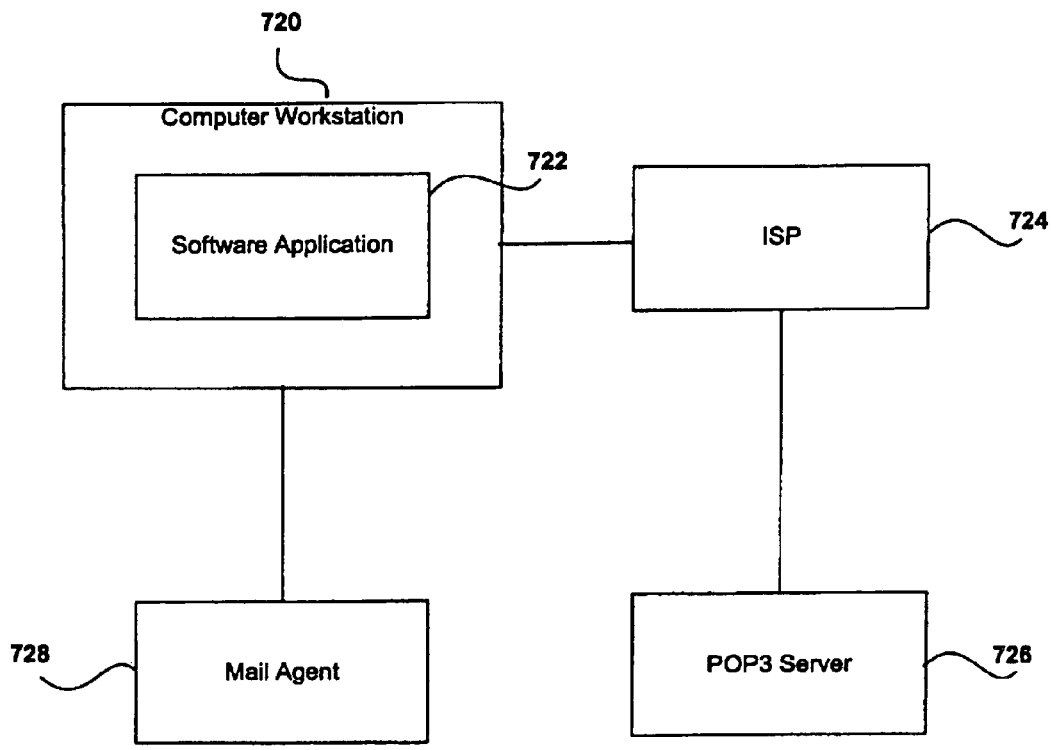
FIG. 13 shows a method of communicating position-information to a computer according to one embodiment of the present invention.

FIG. 13 describes a method in which the position information is communicated to the computer workstation 720 through a "store-and-forward" e-mail. While the computer workstation 720 is off, the position information can be e-mailed to an Internet service provider (ISP) 724 from which the computer workstation 720 obtains its e-mail. The ISP 724 has a post office protocol version 3 (POP3) server 726 to continually store the position information being communicated to the computer workstation 720. When connection is made between the computer workstation 720 and the ISP 724, the computer workstation's mail agent 728 such as Microsoft Outlook obtains the e-mail messages stored in the POP3 server 726. When the software application 722 that plots the position information is executed, it will obtain the position information from the mail agent 728 and plot the position information on a map.

Once the software application 722 has plotted the historical position information, it will then interface with the POP3 server 726 through the ISP 724 to maintain the current position information as received by the ISP 724 from the position reporting device 20.

Anytime the POP3 server 726 receives position information, the software application 722 will plot the newly received position information on a map. The software application 722 can save a history of the position information it has plotted on the map.

Figure 14:
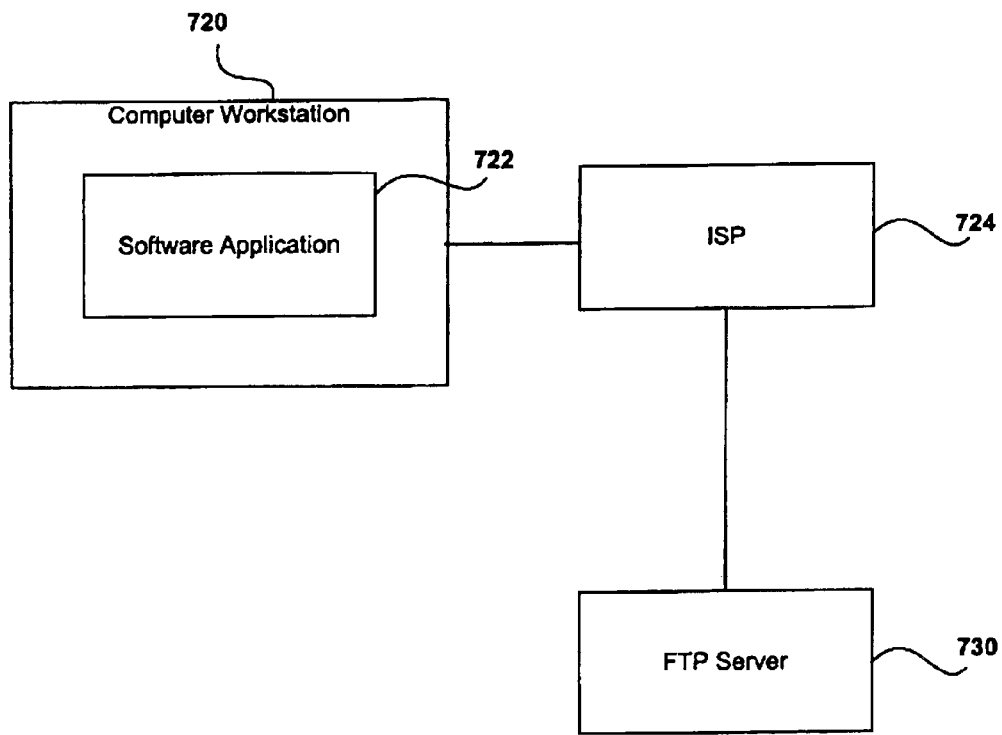
FIG. 14 shows an alternative method of obtaining position information from an FTP server.

FIG. 14 describes an alternative method in which the computer workstation 720 obtains the position information from an FTP server 730. While the computer workstation 720 is turned off, the position information is communicated to an FTP server 730. The computer workstation 720 has access to the FTP server 730 through an ISP 724. When the software application 722 that plots the position information is executed, it will obtain the historical position information by downloading it from the FTP server 730 through the ISP 724, then plot the position information on a map. The software application 722 will access the position information stored on the FTP server 730 associated with the ID of the remote position reporting device 20 of interest. The FTP server 730 may be a service provided by the software application vendor or another company. The software application 722 will continually monitor the FTP server 730 for new position information as received from the position reporting device 20. The software application 722 can save a history of the positions information it has plotted on the map.

The aforesaid methods and steps for remote position monitoring are contained according to this invention on a computer program product. The computer program product is a computer program code mechanism having computer code devices. The computer program code mechanism is embedded in a storage medium and includes instructions which can be used to program or control a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Figure 15:
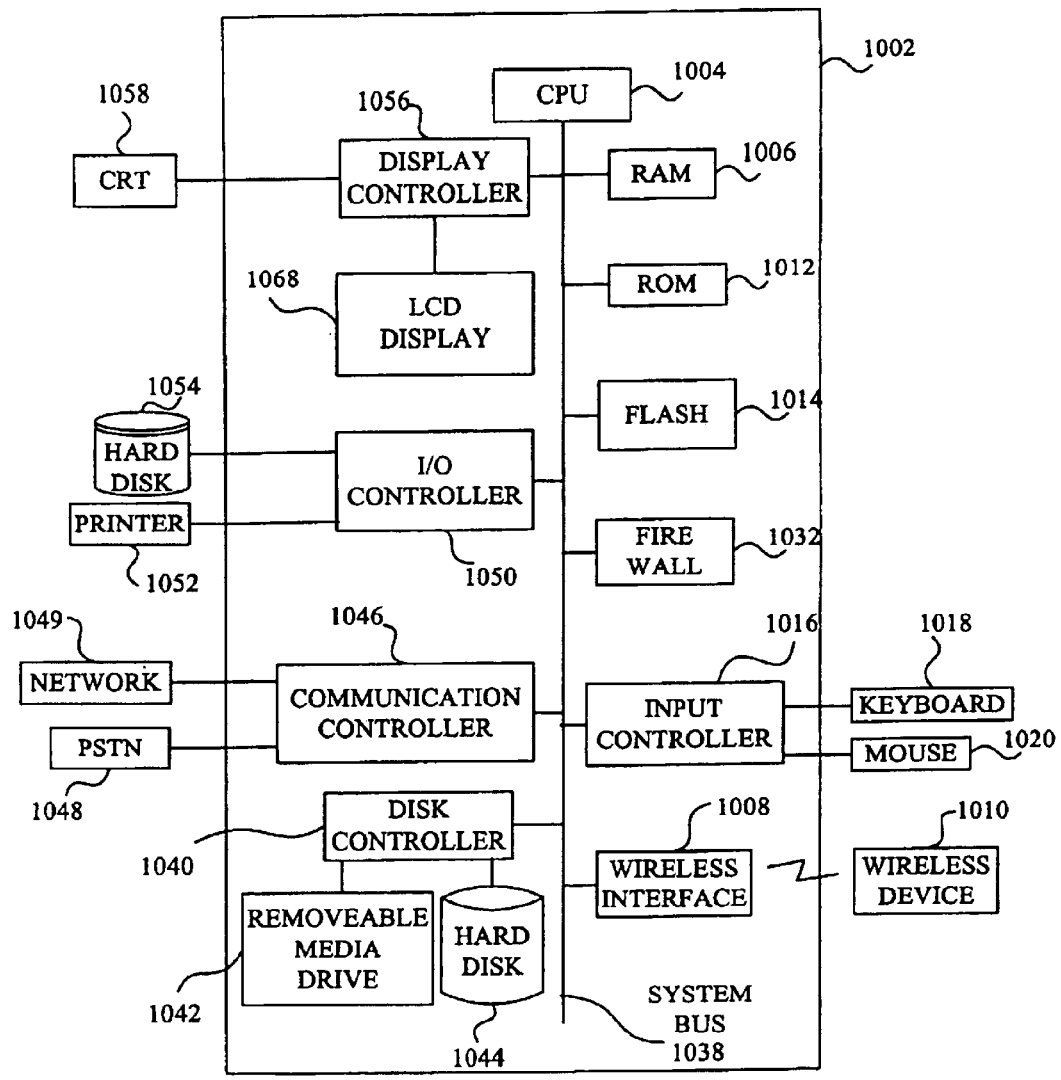
FIG. 15 illustrates the elements of an exemplary computer.

The various computers utilized by the present invention, including the computers 42 and 56A–56D of FIG. 2, may be implemented as illustrated in FIG. 15. Further, any other computer utilized by this invention may be implemented in a similar manner to the computer illustrated in FIG. 15, if desired, including the service machine 114 and computer 120C of FIG. 3. However, not every element illustrated in FIG. 15 is required in each of those computers. In FIG. 15, the computer 1002 includes a CPU 1004 which may be implemented as any type of processor including commercially available microprocessors from companies such as Intel, AMD, Motorola, Hitachi and NEC. There is a working memory such as a RAM 1006, and a wireless interface 1008 which communicates with a wireless device 1010. The communication between the interface 1008 and device 1010 may use any wireless medium (e.g., radio waves or light waves). The radio waves may be implemented using a spread spectrum technique such as Code Division Multiple Access (CDA) communication or using a frequency hopping technique such as that disclosed in the Bluetooth specification.

There is a ROM 1012 and a flash memory 1014, although any other type of non-volatile memory (e.g., EPROM, or an EEPROM) may be utilized in addition to or in place of the flash memory 1014. An input controller 1016 has connected thereto a keyboard 1018 and a mouse 1020. There are serial and parallel interfaces (not shown) connected to serial and parallel devices (not shown). There is an IEEE 1394 device, commonly referred to as a firewall device 1032, connected to an IEEE 1394 interface (not shown). The various elements of the computer 1002 are connected by a system bus 1038. A disk controller 1040 is connected to a floppy disk drive 1042 and a hard disk drive 1044. A communication controller 1046 allows the computer 1002 to communicate with other computers (e.g., by sending e-mail messages) over a telephone line 1048 or a network 1049. An I/O (Input/Output) controller 1050 is connected to a printer 1052 and a hard disk 1054, for example using a SCSI (Small Computer System Interface) bus. There is also a display controller 1056 connected to a CRT (Cathode Ray Tube) 1058, although any other type of display may be used including a liquid crystal display 1068, a light emitting diode display, a plasma display, etc.

Numerous modifications and variations of the present invention are possible in light of the above teachings. It is therefore to be understood that within the scope of the appended claims, the invention may be practiced otherwise than as specifically described herein.

What is claimed is:

1. A computer-implemented position tracking system, comprising:
   means for selecting a destination of position information related to a remotely located device;
   means for selecting a data format for the position information;
   means for transmitting said position information to said selected destination in said selected data format;
   means for receiving said position information from the remotely located device via a wide area network using a protocol; and
   means for mapping the received position information as location indicators on a map.

2. The system of claim 1, wherein at least a portion of the wide area network comprises the Internet.

3. The system of claim 1, wherein said protocol comprises one of a store-and-forward protocol and a direct connection protocol.

4. The system of claim 1, wherein said protocol comprises one of a file transfer protocol and a simple mail transfer protocol.

5. The system of claim 1, wherein:
   said position information comprises historical position information corresponding to a time when said system was inactive; and
   said means for mapping further comprises means for mapping the historical information as location indicators on a map.

6. The system of claim 1, wherein said location indicators indicate at least one of a current position of said remotely located device and a path taken by said remotely located device.

7. A method for mapping a position of a position reporting device, comprising:
   selecting a destination of the position information related to said position reporting device;
   selecting a data format for the position information;
   transmitting said position information to said selected destination in said selected data format;
   receiving said position information from the position reporting device via a wide area network using a protocol; and
   mapping the received position information as location indicators on a displayable map.

8. The method of claim 7, wherein at least a portion of the wide area network comprises the Internet.

9. The method of claim 7, wherein said protocol comprises one of a store-and-forward protocol and a direct connection protocol.

10. The method of claim 7, wherein said protocol comprises one of a file transfer protocol and a simple mail transfer protocol.

11. The method of claim 7, further comprising:
    receiving historical position information from the position reporting device via a wide area network using a protocol, the historical position information corresponding to past position information of the position reporting device;
    mapping the received historical position information as location indicators on a displayable map.

12. The method of claim 7, wherein said location indicators indicate at least one of a current position of said position reporting device and a path taken by said position reporting device.

13. A computer program product, comprising:
    a computer storage medium; and
    a computer program code mechanism embedded in the computer storage medium for causing a computer to map a position of a position reporting device, the computer program code mechanism comprising
    a first computer code device configured to select a destination of position information related to the position reporting device;
    a second computer code device configured to select a data format for the position information; and
    a third computer code device configured to transmit the position information to said selected destination in said selected data format via a wide area network using a protocol.

14. The computer program product of claim 13, wherein:
said third computer code device further comprises a fourth computer code-device configured to transmit historical position information via the wide area network using the protocol, said historical position information corresponding to past position information of the position reporting device.

15. The computer program product of claim 13, wherein:
said computer program code mechanism comprises at least one of a dynamic link library, a static link library, a script, a JAVA class, a C++ class, and a C library routine.

16. The computer program product of claim 13, wherein at least a portion of the wide area network comprises the Internet.

17. The computer program product of claim 13, wherein said protocol comprises one of a store-and-forward protocol and a direct connection protocol.

18. The computer program product of claim 13, wherein said protocol comprises one of a file transfer protocol and a simple mail transfer protocol.

* * * * *